United States Patent
Yang et al.

(10) Patent No.: US 7,067,062 B2
(45) Date of Patent: Jun. 27, 2006

(54) CLOSED END REGENERATION METHOD

(75) Inventors: Arthur Jing-Min Yang, Lancaster, PA (US); Yuehua Zhang, State College, PA (US)

(73) Assignee: Industrial Science & Technology Network Inc., York, PA (US)

(*) Notice: Subject to any disclaimer, the term of this patent is extended or adjusted under 35 U.S.C. 154(b) by 12 days.

(21) Appl. No.: 10/993,352

(22) Filed: Nov. 22, 2004

(65) Prior Publication Data

US 2005/0199545 A1 Sep. 15, 2005

Related U.S. Application Data

(62) Division of application No. 10/110,270, filed as application No. PCT/US00/24472 on Sep. 7, 2000, now Pat. No. 6,838,004.

(60) Provisional application No. 60/152,339, filed on Sep. 7, 1999.

(51) Int. Cl.
*B01D 15/00* (2006.01)
(52) U.S. Cl. .................. 210/670; 210/677; 210/679
(58) Field of Classification Search ............ 21/502.1, 21/510.1, 660, 670, 673, 674, 677, 679, 681, 21/690, 691, 791, 792, 793; 502/400, 405, 502/407, 414
See application file for complete search history.

(56) References Cited

U.S. PATENT DOCUMENTS

| | | |
|---|---|---|
| 5,107,060 A | 4/1992 | Yan |
| 5,401,393 A | 3/1995 | Whitehurst et al. |
| 5,814,226 A | 9/1998 | Tavlarides et al. |
| 5,817,239 A | 10/1998 | Tavlarides et al. |
| 5,990,373 A | 11/1999 | Klabunde |
| 6,007,724 A | 12/1999 | Kulprathipanja et al. |
| 6,057,488 A | 5/2000 | Koper et al. |
| 6,103,126 A | 8/2000 | Boos et al. |

OTHER PUBLICATIONS

Alimarin, I.P. et al., "Concentration, Separation and Determination of Scandium, Zirconium, Hafnium and Thorium with a Silica-Based Sulphonic Acid Cation-Exchanger," *Pergamon Journals Ltd.*, 1987, vol. 34(1), pp. 103-110.

Andreotti, E.I.S. et al., "Adsorption and Structure of Metal Ion Complexes with Piperazine Groups Grafted on Silica Gel Surface," *Journal of Colloid and Interface Science*, 1991, vol. 142(1), pp. 97-102.

(Continued)

*Primary Examiner*—John Kim
(74) *Attorney, Agent, or Firm*—Mayer Brown Rowe & Maw LLP

(57) ABSTRACT

A nanoporous reactive adsorbent incorporates a relatively small number of relatively larger reactant, e.g. metal, enzyme, etc. particles (10) forming a discontinuous or continuous phase interspersed among and surrounded by a continuous phase of smaller adsorbent particles (12) and connected interstitial pores (14) therebetween. The reactive adsorbent can effectively remove inorganic or organic impurities in a liquid by causing the liquid to flow through the adsorbent. For example, silver ions may be adsorbed by the adsorbent particles (12) and reduced to metallic silver by reducing metal, such as irons, as the reactant particles (10). The column can be regenerated by backwashing with the liquid effluent containing, for example, acetic acid.

1 Claim, 2 Drawing Sheets

OTHER PUBLICATIONS

Gennaro, M.C. et al., "Immobilized Ligands on Silica: Uptake of Colbalt and Other Metals by 1-Nitroso-2-Naphthol," *Pergamon Journals Ltd.*, 1985, vol. 5(4), pp. 1013-1015.

Iamamoto, M.S. et al., "Adsorption of Metal Ions from Aqueous and Ethanol Solutions by Silica Gel Functionalized with Pyridinium Ions," *Journal of Colloid and Interface Science*, 1989, vol. 129(1), pp. 162-165.

Ince, H. et al., "Sorption and Preconcentration of Copper and Cadmium on Silica Gel Modified with 3-Aminopropyltriethoxysilane," *Fresenius Journal of Analytical Chemistry*, 1992, vol. 342, pp. 560-562.

Leyden, D.E. et al., "Characterization and Application of Silylated Substrates for the Preconcentration of Cations," *Analytica Chimica Acta*, 1976, vol. 84, pp. 97-108.

Leyden, D.E. et al., "Preconcentration of Trace Metals Using Chelating Groups Immobilized via Silylation," *Analytical Chemistry*, 1975, vol. 47(9), pp. 1612-1617.

Mercier, L. et al., "Access in Mesoporous Materials: Adcantages of a Uniform Pore Structure in the Design of a Heavy Metal Ion Adsorbent for Environmental Remediation," *Advanced Materials*, 1997, vol. 9(6), pp. 500-503.

Mercier, L. et al., "Preparation, Characterization, and Applications as Heavy Metals Sorbents of Covalently Grafted Thiol Functionalities on the Interlamellar Surface of Montmorillonite," *Environmental Science & Technology*, 1995, vol. 29(5), pp. 1318-1323.

Moreira, W.C. et al., "Adsorption and Structure of MCl2 Complex Species on a Chemically Modified Silica Gel Surface with 1,4-Diazabicyclo (2,2,2) Octane," *Journal of Colloid and Interface Science*, 1992, vol. 150(1), pp. 115-120.

Ohshima, K. et al., "Preconcentration of Trace Metal Ions by Complexation with Ethylenediaminetriacetate-Bonded Silica Gel," *Analytical Sciences*, 1986, vol. 2, pp. 131-135.

Soliman, E.M., "Synthesis and Metal Collection Properties of Mono, Di, Tri, and Tetramine Based on Silica Gel Matrix," *Analytical Letters*, 1997, vol. 30(9), pp. 1739-1751.

Tikhomirova, T.I. et al., "Sorption of Noble-Metal Ions on Silica with Chemically Bonded Nirtogen-Containing Ligands," *Pergamon Press plc*, 1991, vol. 38(3), pp. 267-274.

Tong, A. et al., "Selective Preconcentration of Au(III), Pt(IV) and Pd(II) on Silica Gel Modified with y-aminoopropyltriethoxysilane," *Analytica Chimica Acta*, 1990, vol. 230, pp. 179-181.

US 7,067,062 B2

CLOSED END REGENERATION METHOD

CROSS REFERENCE TO RELATED APPLICATIONS

This application is a divisional application of U.S. Ser. No. 10/110,270, filed Sep. 30, 2002, U.S. Pat No. 6,838,004, which is further the National Phase of PCT/US00/24472, filed Sep. 7, 2000, which designates the United States and was published in English, and which further claims priority from U.S. Provisional Application No. 60/152,339, filed Sep. 7, 1999. These applications, in their entirety, are incorporated herein by reference.

This invention was made with Government support under Contract No. DE-FG02-97ER82409 awarded by the Department of Energy. The Government has certain rights to this invention.

FIELD OF THE INVENTION

This invention relates to nanoporous reactive adsorbents and to the use thereof in removing impurities from liquids. More particularly, this invention relates to silica based nanoporous adsorbents having very high density of chemical surface modifying ligands further modified to include chemically reactive species and to the use thereof for purifying contaminated liquids.

TECHNOLOGY BACKGROUND AND COMPARISON WITH EXISTING ART

The most common method of removing waste species from a liquid stream is by adsorption. Such a method can be applied to water purification in a continuous operation with water flowing through a column or over a fixed bed of the solid adsorbent. Commercial ion-exchange resins and carbon black filters are examples of this approach.

The common characteristics of an efficient adsorbent include a large surface area and connected (i.e. open) porous structure for fast diffusion. Recent developments in this technical field include the incorporation of molecular recognition functional species (i.e. metal-binding ligands) onto the surface of various inorganic or organic carrier materials to achieve the selective adsorption of a particular group of ions out of the background ions. Among all the carrier materials explored in this developmental field, the synthetic silica gel is the most widely studied. This is because the synthetic nanoparticle silica contains a large amount of active silanol groups on its surface, necessary for the incorporation of metal-binding ligands, and has an exceptionally high surface area as well as open porous structure, necessary for achieving a rapid high-capacity adsorption.

Although much prior art has been developed based on the identical principle of incorporating metal-ion binding functional groups onto the surface of nanopore silica, the characteristics of the resulting silica-ligand composite products may differ significantly[1,2,3,4,5,6,7] depending on the routes of processing.

[1] L. Mercier and T. Pinnavaia, *Adv., Mater.*, 9, No. 6, pp 500–503 (1997)

[2] L. Mercier, C. Detellier, *Environ. Sci. Technol*, 29. p 1316 (1995)

[3] M. S. Iamamoto, Y Gushikem, *J. Colloid Interface Sci.* 129, p 162 (1989)

[4] E. I. S. Andreotti, Y Gushikem, *J. Colloid Interface Sci.* 142, p 97 (1991)

[5] W. C. Moreira, Y Gushikem, O. R. Nascimento, *J. Colloid Interface Sci.* 150, p 115 (1992)

[6] U.S. Pat. No. 5,814,226, September 1998, Lawrence L. Tavlarides, Nandu Deorkar

[7] U.S. Pat. No. 5,817,239 October 1998, Lawrence L. Tavlarides, Nandu Deorkar.

Different processing techniques may start with silica gels similar in porosity and specific surface area (surface area per gram of silica) but could end up with products of distinctly different loading of the ligand groups. Or, two composites may contain a similar amount of loading of functional groups and yet differ considerably in adsorption efficiency.

One of the present inventors has recently developed an advancement in technology of the surface modification of low-density silica gel (CSMG) which can produce high surface area silica with extremely high loading of functional groups that increases the adsorption efficiency and capacitance of the silica adsorbent to a significantly higher level; this technology is the subject matter of U.S. application Ser. No. 09/601,888, filed Aug. 9, 2000, based on Provisional Application Ser. No. 60/074,026, filed on Feb. 9, 1998 and International PCT Application PCT/US99/02181, filed Feb. 3, 1999, the disclosures of which are incorporated herein in their entirety by reference thereto.

The present inventors recognized that a high-capacity adsorption may lead to a much higher concentrated environment of adsorbed specie on the surface of an adsorbent when compared with the specie concentration in the passing stream. Such increased specie population density on the pore surface could significantly increase the reaction rate of the adsorbed specie with other reactants existing nearby. Moreover, the change in the electronic state of adsorbed specie during chemisorptions could also affect its reaction rate favorably. The adsorbent, therefore, could function as a heterogeneous catalyst for the chemical reaction of adsorbed species. If the adsorbed waste specie can be converted to a less harmful or even useful specie by such a reaction, the adsorbent then becomes a reactive adsorbent. The additional option of in-situ reaction to convert the adsorbed specie provided by a reactive adsorbent can significantly increase its treatment capacity because the converted waste species normally do not occupy the surface adsorption sites any longer. The present invention is based, in part, on the recognition and utilization of the foregoing considerations.

SUMMARY OF THE INVENTION

This invention has been accomplished by embedding reactive species into the structure of a nanopore adsorbent in order to convert waste or undesirable species in situ during filtration as well as to increase the treatment capacity of the adsorbent towards a specific waste specie and/or recoverable specie having intrinsic value.

Thus, for example, the present invention, in one particular embodiment, provides for treating heavy metal ions in a waste stream. However, this invention may also be extended to other reactive adsorption applications by appropriate selection of the embedded reactive species.

In another aspect of the invention, there is provided a regeneration scheme that utilize the reactive nature of the nanopore adsorbent by applying backwash effluent repetitively through the reactive adsorbent to first remove the adsorbed species and then react them with the reactant embedded within the adsorbent. Such a regeneration scheme does not require additional treatment of the backwash effluent and is hereby given the name of close-end regeneration.

The above features of the present invention are accomplished according to one embodiment of the invention by a composite nanopore reactive adsorbent comprising a continuous phase comprised of adsorbent particles and interstitial pores therebetween, and a phase comprised of reactant particles contained in domains surrounded by the adsorbent particles and their interstitial pores, thereby forming an intimate admixture of adsorbent particles, reactant particles and interstitial pores, wherein the size of the reactant particles is at least several times larger than the size of adsorbent particles such that the interstitial pores predominantly reside with the adsorbent particles, and wherein the relative volume fraction of the interstitial pores in the continuous phase to that of the adsorbent particles is larger than the percolation threshold value so that the continuous phase contains connected open pores.

Preferably, in the above nanopore reactive adsorbent, the adsorbent particles are formed from precipitated silica or the adsorbent particles comprise chemically surface modified amorphous silica gel. In a preferred embodiment of this aspect of the invention, the reactant particles are comprised of metal effective as an in-situ reducing reagent, such as, for example, magnesium, aluminum, iron, and/or zinc. However, the reactant particles may be comprised of a solid redox reagent effective to react with an adsorbed species, or in still another embodiment, the reactant particles are comprised of a catalyst, such as an enzyme, or other organic or inorganic catalyst, which is effective to react with an adsorbed species.

According to another aspect, the present invention provides a method for producing the composite nanopore reactive adsorbent as described above, comprising:

reacting an inorganic metal oxide nanoporous gel precursor characterized by a plurality of open channels within the gel structure and hydroxyl reactive groups on the surface thereof, with a coupling reagent reactive with said hydroxyl reactive groups, in an aqueous alcoholic medium under an inert atmosphere and at an elevated temperature within the range of from about 40° C. to about 80° C. to cause the coupling reactant to condense and react with said hydroxyl reactive groups to form a grafted metal oxide sol;

(b) mixing and stirring the grafted silica sol with reactant particles; and (c) gelling the stirred mixture from step (b).

In the above method, the gel precursor may comprise a silica gel precursor or the gel precursor may comprise an oxide of a metal selected from the group consisting of silicon, zirconium, aluminum, titanium, iron and lanthanum.

In accordance with still another aspect of the invention, there is provided a method for separating an inorganic or organic target specie from a liquid containing the target specie (e.g., a metal, such as silver; a microbiological contaminant, such as protein, viral particles; and the like) which comprises contacting the liquid with a nanopore reactive adsorbent having a reactive embedded species among the interstitial pores thereof. For example, in the case where the target specie comprises silver ions, the reactant particles of the reactive adsorbent may comprise iron particles, whereby the adsorbed silver ions are reduced by the iron particles to metallic silver. The recovered specie, e.g., silver metal, will preferably be recovered from the adsorbent.

In a particularly preferred embodiment of this aspect of the invention the nanopore reactive adsorbent is present in or as a filter medium.

According to still another aspect of the invention, there is provided a closed end regeneration method which comprises adsorbing a specie from a starting liquid containing the specie by contacting the liquid with a nanopore reactive adsorbent comprising connected interstitial pores having adsorption sites on the surfaces thereof, and containing among the interstitial pores thereof reactant particles which are reactive with said specie, to thereby remove at least some of said specie from said liquid, thereby forming spent adsorbent;

flowing a treating liquid through the spent nanopore reactive adsorbent to remove adsorbed specie from said adsorption sites and partially regenerate said reactant particles, thereby generating effluent treating liquid, and reflowing said effluent treating liquid through the treated spent nanopore reactive adsorbent at least once to regenerate said adsorption sites and said reactant particles.

BRIEF DESCRIPTION OF THE DRAWINGS

FIG. 1-B is a schematic view of an alternative embodiment of nanopore reactive adsorbent according to the invention;

DETAILED DESCRIPTION OF THE INVENTION

Working Principles

Figure 1A:
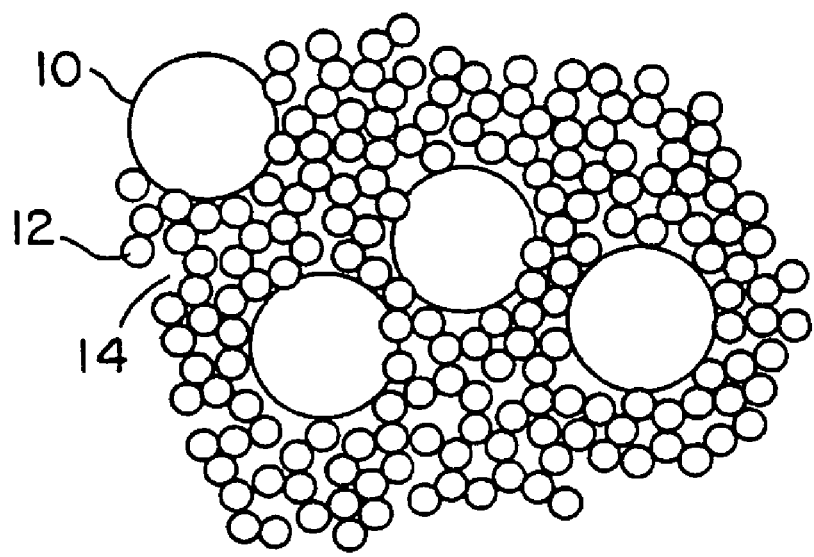
FIG. 1-A is a schematic view of nanopore reactive adsorbent according to the invention.

A wet low-density silica gel normally contains a porous open-cell structure. Water flows and ions diffuse freely within this kind of open structure. Thus, the entire surface area of the pores can be accessed rapidly. The open porous structure will increase the efficiency and speed of ion adsorption in a water treatment operation. In addition, such an open structure is necessary for the incorporation of large functional groups onto the entire surface. Without an open structure, the incorporation of the functional groups in the preparation of the silica-ligand composite and the binding of targeted ions onto those ligands in a treatment operation become extremely slow and inefficient. Much prior art is attempted to graft various ligand groups onto the surface of porous silica for ion-specific adsorption. However, because of the inefficiency, the loading and adsorption capacities of those ligands were consistently lower than 1 mmole per gram of silica[8,9,10,11,12,13,14,15,16].

[8] D. E. Leyden and G. H. Luttrell, *Analytical Chemistry* 47 (9): pp 1612–1617 (1975)

[9] D. E. Leyden and G. H. Luttrell, *Analytical Chimiica Acta*, 84, pp 97–108 (1976).

[10] M. C. Gennaro, E. Mentasti, and C. Sarzanini, pp 1013–1015 (1985)

[11] K. Ohshima, H. Watanabe, and K. Haraguchi, *Analytical Sciences* 2: pp 131–135 (1986)

[12] A. Tong, Y. Akama, and S. Tanaka, *Analytica Chimica Acta* 230: pp 179–181 (1990)

[13] I. P. Alimarin, V. I. Fadeeva, et al., *Talanta* 34(1): pp 103–110 (1987)

[14] T. I. Tikhomirova, V. I. Fadeeva, et al. *Talanta* 38(3): 267–274 (1991)

[15] H. Ince, S. Akman, and U. Koklu, *Fresenius Journal of Analytical Chemistry* 342: 560–562 (1992)

[16] E. M. Soliman, *Analytical Letters* 30(9): 1739–1751 (1997)

The aforementioned new class of surface-modified low-density silica gel (CSMG), as described in the aforementioned U.S. Ser. No. 09/601,888 and PCT/US99/02181, is produced by chemically modifying a freshly produced (i.e.

gelled without prolonged aging) silica gel still in its wet state with molecular recognition ligand groups. This new class of silica-ligand composite, CSMG, has a characteristic open pore structure, as well as an exceptional high loading of surface ligands, both resulting from controlling the interfacial energy and processing kinetics during its preparation. Compared with existing art in the field, CSMG differs in the following four categories:

(1) Composition: much higher loading of ligands (7.5 mmole per gram of support), (2) Morphology: open channels connecting micro- and nanopores, (3) Adsorption efficiency: majority of the loaded ligands are accessible, (4) Processing efficiency: significantly reduced processing time, (5) Solvent systems of processing: environmentally benign solvents.

As described in the aforementioned applications, the surface density of fully dense monolayer coverage for CSMG was estimated to be $5 \times 10^{18}$ molecules per square meter of surface area. The ligand loading percentage on the silica surface achieved is close to 100%, based on the loading of 7.5 mmole ligand per gram of silica, (for a specific surface area of 900 $m^2/g$ silica). It is readily apparent that the utilization of the surface ligands of the CSMG for binding metal ions is far more efficient, e.g., rapid and complete, than achieved with prior art silica particles. For instance, adsorption tests done by mixing adsorbent with waste solution for one hour indicated a utilization of the surface ligand group is greater than about 50% for the CSMG used in the present invention, as compared to at most, about 25% for the prior art silica particles. It is presumed that in CSMG, the dense ligand groups, randomly distributed on the convex particle surfaces, are spreading outward and are more accessible for binding metal ions from the solution.

The metal ion adsorption capacity of the CSMG (140 mg adsorbent in 200 ml solution, for 1 hour, pH 23) as previously reported in Ser. No. 60/074,026, was as follows:

|  | Capacity (mg/g |
|---|---|
| $Ag^+$ | 707 |
| $Pb^{2+}$ | 253 |
| $Hg^{2+}$ | 737 |
| $Cu^{2+}$ | 243 |

These data demonstrated that the metal ions adsorbed on the CSMG surface (concentration approx. $5 \times 10^{18}$ molecules per square meter) are far more condensed than the population in the waste stream (estimated as $10^{16}$ molecules per square meter cross sectional area for part per thousand waste concentration). If there are other species reactive to the metal ions existing near the surface of the adsorbent, the condensed state resulting from the strong surface adsorption is likely to increase the reaction rate significantly.

The present invention takes advantage of the high adsorbed metal ion concentration by intermixing, as described below, reactive particles with adsorbent particles.

The composition as well as the microstructure according to this invention contains at least three different phases: adsorbent particles, reactant particles and interstitial pores. The size of the reactant particles is at least several times larger than the size of adsorbent particles so that the interstitial pores are predominantly residing with the adsorbent particles. (The smaller particles and their interstitial pores fill the interstitial region of the larger particles.) The total volume fraction of the larger particles is controlled so that the larger particles are in domains surrounded by smaller particles and their interstitial pores. In the continuous phase composed of the smaller particles and their interstitial pores, the relative volume fraction of the pores to that of the smaller particles is larger than the percolation threshold value so that the continuous phase contains connected open pores. The material disclosed in this invention with the described unique composition and microstructure is hereafter referred to as the Nanopore Reactive Adsorbent.

Figure 1B:
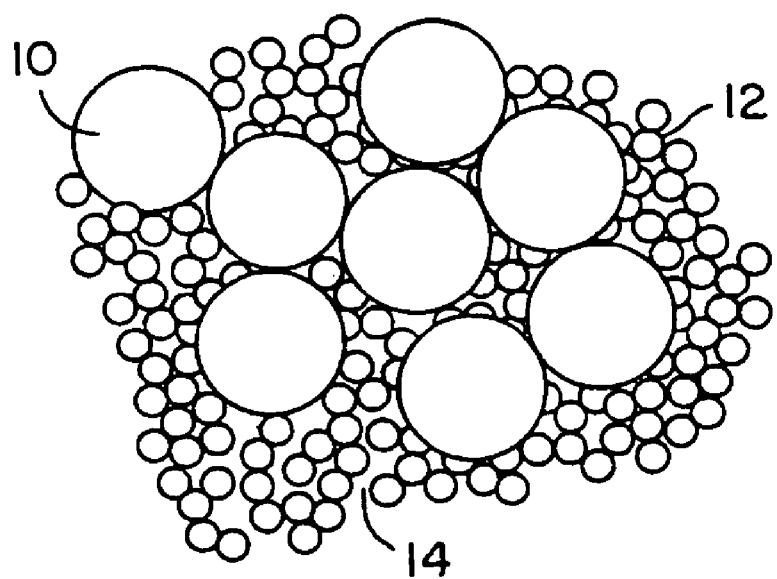

FIGS. 1-A and 1-B are illustrations of embodiments of this concept wherein reference numeral 10 identifies the reactant particles, reference numeral 12 identifies the adsorbent particles and reference numeral 14 identifies the interstitial pores. In FIG. 1-A the larger reactant particles 10 are embedded within the continuous phase substantially as isolated or discontinuous phases. In FIG. 1-B, the larger reactant particles 10 are in contact with each other, forming a second continuous phase, namely, a bi-continuous structure.

Because the size of silica particles and pores in a CSMG is in the range of several to about ten nanometers, it is possible to embed a large amount of micron-sized (or larger) solid reactant particles into the gel structure without blocking the flow and diffusion of the liquid stream that carries the waste species. As long as one continuous phase of such a composite is composed of the nanopore silica, the liquid can flow around these embedded particles through the open channels within the silica phase.

The presence of a reactant in the condensed solid state near the pore surfaces that are already adsorbed with a dense layer of the second reactive specie creates the opportunity for a rapid reaction between the two species. Enclosing the solid reactant particles with the nanopore silica immobilizes the solid reactant phase, thus, for example, facilitating use within a filtration column. The increased reaction rate as well as the prolonged residence time of the reactive waste species due to surface adsorption allows a high degree of reaction during a filtration treatment of a waste specie or other desirable or undesirable specie for recovery or discharge of the specie and/or discharge of the treated liquid.

For example, according to a specific embodiment of the present invention iron particles are embedded in a CSMG or precipitated silica or other metal oxide adsorbent to enhance the capacity of adsorbing silver ions from photographic waste. The CSMG adsorbent, due to the high loading of mercaptan containing functional groups, can adsorb high amounts of silver ions and reduce its concentration in the waste to parts per billion with a single treatment. The embedded iron particles can react with the surface-adsorbed silver ions and reduce them to silver metal. Because of the increased reactivity by dense surface adsorption, the chemical reaction can occur during the filtration process, leaving the silver metal deposits within the CSMG column. The reduction of silver ion to metal form deposited within the column is beneficial to the treatment in at least three ways:

The silver ions being reduced to metallic form, are ready for recovery.

The metal silver particles are highly condensed and can be deposited in large quantities within the filtration column.

The silver ions adsorbed on the CSMG surface are reduced to metal, releasing the surface active site for further adsorption and increasing the capacity of waste treatment.

The following examples illustrate this embodiment of the present invention.

EXAMPLE 1

CSMG Embedded with Iron Particles

Silica sol is prepared from tetraethoxysilane (TEOS), $H_2O$, ethanol and HCl, in the total molar ratio 1:2:4:0.0007. The mixture of 50 ml of silica sol and an amount (depending on the desired % of ligand loading) of 3-mercaptopropyltrimethoxysilane is added into a reaction vessel equipped with agitator, heating mantel, thermometer and nitrogen purge system. Additional amounts of water or ethanol are used to adjust the water/ethanol ratio in the solvent mixture so that their properties are suitable for the amount of ligand desired. After the reaction mixture is heated to 50–60° C. for 1–2 hours, a desired amount of Fe powder is added with vigorous stirring. Then, a $NH_4OH$ solution is added to the mixture to induce gelation.

After cooling, the Fe powder-loaded CSMG is aged over night and successively washed thoroughly with ethanol and water.

EXAMPLE 2

Precipitated Silica Embedded with Iron Particles

A diluted sodium silicate solution is strongly stirred. To this solution, a desired amount of Fe powder (depending on the desired concentration of Fe in the gel) is added. Then an acidic solution is added to the mixture to induce gelation. The kinetics of the gelation reaction must be controlled so that the porosity and the amount of surface active silanol groups are optimized for silver ion adsorption. The Fe powder-loaded silica is aged over night and then dried.

Characterization and Analysis

Adsorption efficiency and capacity were determined for bare CSMG and precipitated silica respectively by flowing 2000 ppm $Ag^+$ standard through a column of the adsorbent. Effluent samples are collected periodically for the analysis of residual silver ion concentration. The treatment capacity of CSMG is about three times of that of precipitated silica because of the dense mercaptan groups already incorporated on the surface of CSMG silica. However, the precipitated silica embedded with iron particles prepared according to Example 2 with silica to iron weight ratio as 3 to 1 exhibits a capacity exceeding that of bare CSMG.

Figure 2:
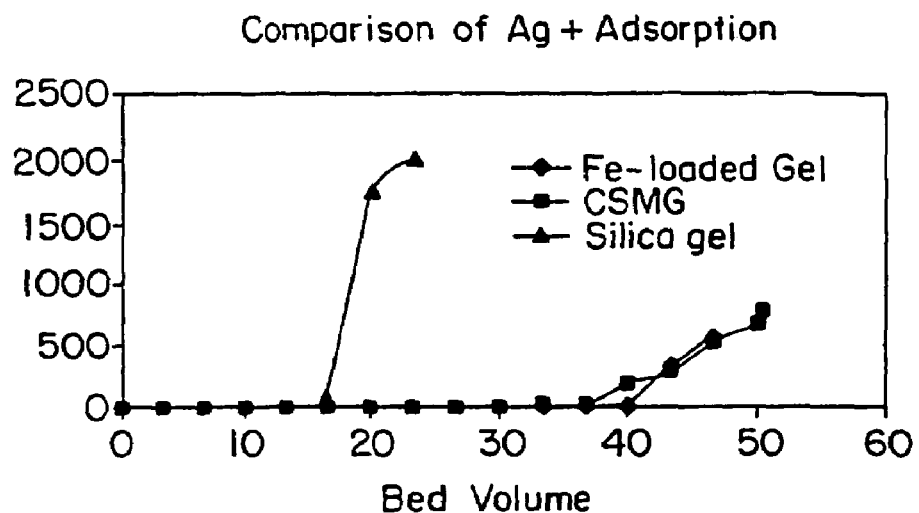
FIG. 2 is a graph plotting silver adsorption as a function of Bed Volume for a conventional silica gel, a chemically surface modified silica gel (CSMG) and a iron-loaded silica gel adsorbent according to this invention.

Enclosing iron particles increased the treatment capacity of precipitated silica three fold. The improvement may be even greater by increasing the weight ratio of iron to silica. The comparison of the respective adsorption capacity is demonstrated in FIG. 2.

Although described primarily with respect to silica gels the composite nanopore reactive adsorbent of the present invention may be formed starting from other metal oxides, such as, for example, zirconia, titania, alumina, iron oxide, lanthanum oxide, and the like.

The composite nanopore reactive adsorbent may be used in bulk form, as described above, or adsorbent particles may be shaped into various forms, so long as the basic properties are not modified. The adsorbent may also be distributed in and among porous or microporous filter media inert to the liquid to be treated. For example, a paper or plastic filter or membrane material may be incorporated with the composite adsorbent to further facilitate removal of unwanted contaminants or other valuable specie in a liquid media. A multilayer filter media may include, for example, a layer of the composite nanopore reactive adsorbent in one layer and bare CSMG or other metal adsorbent in a second or adjacent layer.

The present invention thus provides a new class of material, referred to herein as Nanopore Reactive Adsorbent. This class of material is composed of adsorbent particles of nanometer size at a low density with interconnecting nanopore structure. The nature of low-density and nanopore size, assures a high specific surface area which will facilitate high-efficiency adsorption and surface modification. Reactant or catalyst, as described herein, with a particle size much larger than the average pore size, are embedded within and among the nanopore adsorbent to promote reaction along with the adsorption. Furthermore, the adsorbent surface can be chemically modified to enhance the adsorption capacity, selectivity or reactivity of the adsorbed species. Compared with traditional waste treatment methods by adsorption, reaction, or heterogeneous catalysis, the new Nanopore Reactive Adsorbent offers the following performance advantages:

(1) Direct conversion of waste species into useful or a less harmful product: In the example given, silver ions were reduced by iron particles into silver metal. Bacteria or enzyme may be used in a similar fashion to convert other waste species, proteins, etc.

(2) The reaction increases the treatment capacity and efficiency of the adsorbent: The reaction of adsorbed specie into a product can refresh the surface sites for additional adsorption. The capacity is higher because of the reactive conversion.

(3) The adsorption enhances the reaction rates of the reactants: The adsorption of a reactive specie from the waste stream (like the retention of a specie in a chromatography column) prolongs its residence time in the column. During the residence time the embedded reactant or catalyst can effectively convert the adsorbed specie into product.

(4) Significantly increased speed of treatment: The adsorption holds back the progression of the material front of the waste specie, thus allowing the waste stream to be fed with a much higher flow rate.

(5) Close-end regeneration of the adsorbent by reactive adsorption: When a normal adsorbent column reaches its adsorption capacity, it can be regenerated by backwash with an appropriate treating liquid, as well known in the art. However, the backwash effluent must be treated separately in order to remove the waste species. For example, the effluent from regenerating a cation-exchange resin must be precipitated by sodium hydroxide solution. In the case of a reactive adsorbent, the effluent can be fed back into the column for engaging additional reaction. The example below illustrates this unique feature of the reactive adsorbent.

For example, during the use of an iron-embedded silica column to treat a heavy metal waste solution, a breakthrough point will be reached when the ion concentration in the exiting effluent approaches the discharge limit allowed for that particular ion. Normally at this point, a large amount of iron particles embedded in the silica are still not yet consumed. However, the reaction rate of the heavy metal ions with iron will have decreased to a point such that the traveling time through the column is no longer enough for a thorough reaction. The reduced reaction rate is partially due to the build-up of ferrous oxide deposits on the surface of the iron particles. A major reduction in treatment efficiency is also due to the exhaustion of surface adsorption sites on the silica surfaces.

The present invention therefore, provides a method for regenerating the column of spent or partially spent Nanopore Reactive Adsorbent by backwashing with an acidic solution back and forth.

Thus, the first batch of backwash not only provides clean up the oxides of the iron particles, but also replaces the adsorbed heavy metal ions on the silica surface by hydronium ions. Furthermore, the effluent of backwashing can be flowed back through the column to remove the heavy metal ions by reacting with iron particles. In a normal ion-exchange system there will be no net gain by flowing a backwash solution through the column again. However, because of the reactive nature of the Nanopore Reactive Adsorbent, the heavy metal ions in the first batch will be retained by adsorption to the regenerated silica surface and therefore will have time to be reduced by the regenerated iron particles to metallic silver. After repetitive backwash, the silica surface and the iron particles are fresh again for additional reactive adsorption. In addition, the heavy metal ions previously adsorbed on the silica surface are converted by the reactant to their metallic form.

This aspect of the present invention is illustrated by the following example.

EXAMPLE 3

Regeneration of Iron-embedded Silica Adsorbent

Figure 3:
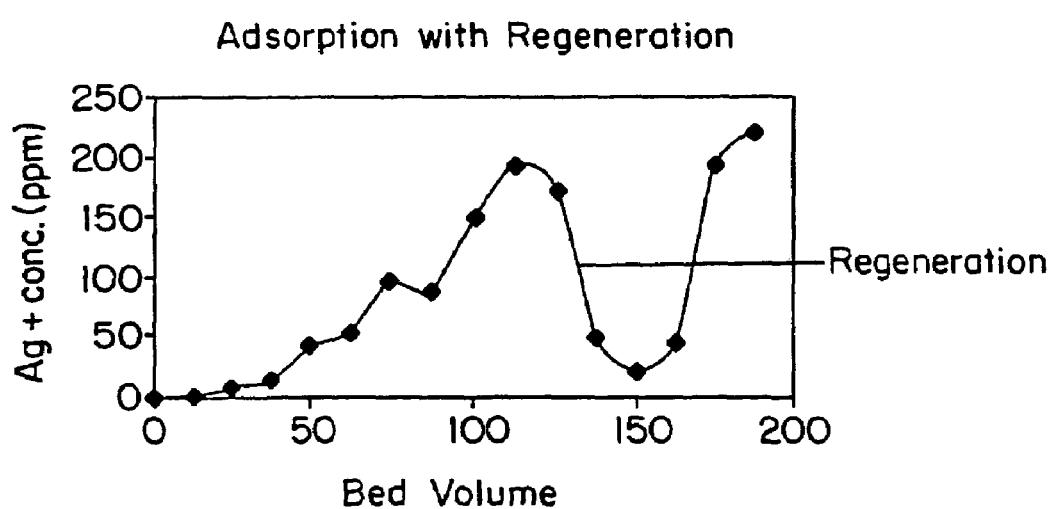
FIG. 3 is a graph plotting amount (ppm) of adsorbed specie (Ag+) as a function of bed volume during adsorption with regeneration in accordance with one embodiment of the present invention.

The iron-embedded silica made from Example 2 was packed into a column for treating simulated waste solution with 1620 ppm initial silver concentration. After passing 125 bed volume of solution, the column was regenerated with 2 M acetic acid. After regeneration, the flow was continued until reaching 187 bed volume. The results are shown in FIG. 3.

As noted above, one of the specific applications of the present invention is the recovery of silver (from silver ions) in spent photographic waste (e.g., photodeveloping liquids), using, e.g., iron, as the reactant particles. Conventionally, this is accomplished by flowing the silver containing liquid through steel wool filters (functioning as batch or plug-flow reactor). However, in this case, there is no adsorption of the silver ions by the batch or plug flow reactor. Therefore, it is necessary to very slowly flow the waste liquid through the steel wool. Accordingly, the present invention contemplates connecting the Nanopore Reactive Adsorbent, in series, with the steel wool filter, thereby combining the capacity of the steel wool with the efficiency of the Nanopore Reactive Adsorbent. Accordingly, the treatment speed and overall flow rate can be increased by several to ten-fold greater than the flow through only the batch or plug-flow reactor.

While the above description is based primarily on the use of metal, e.g., iron, as reactant particles, those skilled in the art will recognize that the selection of the reactant particles will depend on the specie to be removed and/or recovered from the liquid supply. Thus, in the case of, for example, removing biological contaminants, such as microorganisms, e.g., bacteria, spores, viral particles and the like, the catalyst and the reactant particles may be an enzyme or other reactive substance for the particular biological contaminant.

The present invention may, for example, be used to remove mercury from hydrocarbon feedstocks, as in, for example, U.S. Pat. No. 5,107,060, using as reactant particles a substance selected from the group consisting of copper, gold, silver, iron, bismuth and tin, as metals, oxides and sulfides, or using solid sulfur particles, as disclosed in U.S. Pat. No. 5,401,393. Other reactive particles for removing mercury are mentioned in the backgrounds of U.S. Pat. No. 5,107,060 and U.S. Pat. No. 5,401,393, the disclosures of which is incorporated herein by reference thereto.

The reactive adsorbents of this invention may be used, for example, with organic reactant particles, such as disclose in, for example, U.S. Pat. No. 6,007,724, which discloses a process for treating a liquid feed stream containing an iodine-containing compound by contacting the liquid stream with an adsorbent comprising a solid carrier having deposited thereon a metal phthalocyanine compound where the metal is selected from the group consisting of silver, mercury, copper, lead, thallium, palladium, and mixtures thereof, at adsorption conditions effective to adsorb the iodine-containing compound on the adsorbent to yield a treated liquid stream. In accordance with the present invention, the adsorbent comprises porous open-cell structure as described herein. The disclosure of U.S. Pat. No. 6,007,724 is incorporated herein in its entirety, by reference thereto.

U.S. Pat. No. 5,990,373, titled "Nanometer sized metal oxide particles for ambient temperature adsorption of toxic chemicals" discloses removal of toxic target chemical compounds, such as, for example, HCN, $P(O)(OCH_2CH_3)(CN)(N(CH_3)_2)$, ClCN, $(CF_3)_2C=CF_2$, $Zn(CH_2CH_3)_2$, $Hg(CH_3)_2$, $Fe(CO)_5$, $(P)(O)(CH_3)(F)[OCH(CH_3)_2]$, $S(CH_2CH_2Cl)_2$, $C_6H_5C(O)CH_2Cl$, $C(O)Cl_2$, $C_6Cl_5OH$, $C_6H_3(OH)(NO_2)_{,3}$, $C_6H_5(Br)(CN)$, $C_6H_5CH_2CN$ and $(CF_3)C=CF_2$, using as adsorbent particles, MgO and CaO, preferably at a temperature in the range of –70 to 90° C. and at atmospheric pressure. The reactive adsorbent of the present invention may also be used for the removal of the above mentioned toxic chemicals using MgO or CaO as the reactant particles, in accordance with the conditions as described in U.S. Pat. No. 5,990,373, the disclosure of which is incorporated herein in its entirety by reference thereto.

U.S. Pat. No. 6,057,488, titled "Nanoparticles for the destructive sorption of biological and chemical contaminants" describes a method for destroying a target component, such as hydrocarbons, halogenated hydrocarbons, diethyl-4-nitrophenyl phosphate (paraoxon), 2-chloroethyl ethyl sulfide (2-CEES), dimethylmethylphosphonate (DMMP), bacteria such as *Bacillus Cereus, Bacillus Globigii*, Chlamydia and/or Rickettsiae, fungi and viruses, by contacting the target component with a metal oxide adsorbent, such as MgO, wherein the adsorbent contains either reactive atoms selected from the group consisting of halogens and alkali metals stabilized on the surfaces of the adsorbent or ozone and wherein the contacting is conducted at a temperature of –40 to 600° C. for a time period of at least about 4 seconds. The reactive adsorbent of this invention can be adapted to the process disclosed in U.S. Pat. No. 6,057,488, the disclosure of which is incorporated herein, in its entirety, by reference thereto, by utilizing the stabilized halogens or alkali metals as the reactant particles.

The reactant particles may also comprise, for example, polynuclear metal oxyhydroxides, as disclosed in U.S. Pat. No. 6,103,126, for the selective elimination of inorganic phosphate from liquids, in particular from body fluids containing protein such as whole blood, plasma, liquid contents of the intestine as well as from dialysis fluid. The disclosure of U.S. Pat. No. 6,103,126 is incorporated herein in its entirety by reference thereto.

The invention claimed is:

1. A closed end regeneration method which comprises adsorbing a specie from a starting liquid containing the specie by contacting said liquid with a nanopore reactive adsorbent comprising connected interstitial pores having adsorption sites on the surfaces thereof, and containing among the interstitial pores thereof reactant particles which are reactive with said specie, thereby removing at least some of said specie from said liquid and forming spent adsorbent, flowing a treating liquid through the spent adsorbent, said treating liquid being capable of regenerating the reactant particles and removing adsorbed specie from the adsorption sites of the interstitial pores, to thereby regenerate at least some of said reactant particles and said adsorption sites and forming an effluent treating liquid, and flowing the effluent treating liquid at least two times through the nanopore reactive adsorbent to regenerate said reactant particles and said adsorption sites, while converting the specie removed from said adsorption by in situ reaction with said reactant particles.

* * * * *